(12) United States Patent
Weinberg-Sehayek et al.

(10) Patent No.: US 9,462,825 B2
(45) Date of Patent: Oct. 11, 2016

(54) SPAGHETTI-LIKE FISH PRODUCTS, METHODS OF MANUFACTURE THEREOF

(71) Applicant: GRADIENT AQUACULTURE, Shenzhen (CN)

(72) Inventors: Noam Weinberg-Sehayek, Emek Hefer (IL); Avraham Weinberg, Kiryat Yam (IL)

(73) Assignee: GRADIENT AQUACULTURE, Shenzhen (CN)

( * ) Notice: Subject to any disclaimer, the term of this patent is extended or adjusted under 35 U.S.C. 154(b) by 0 days.

(21) Appl. No.: 14/601,765

(22) Filed: Jan. 21, 2015

(65) Prior Publication Data

US 2015/0132434 A1  May 14, 2015

Related U.S. Application Data

(63) Continuation-in-part of application No. PCT/IB2014/063294, filed on Jul. 22, 2014.

(60) Provisional application No. 61/856,807, filed on Jul. 22, 2013, provisional application No. 62/087,294, filed on Dec. 4, 2014.

(51) Int. Cl.
| | |
|---|---|
| *A23P 1/12* | (2006.01) |
| *A23L 1/325* | (2006.01) |
| *A23L 1/29* | (2006.01) |
| *A23L 1/307* | (2006.01) |

(52) U.S. Cl.
CPC .............. *A23L 1/3255* (2013.01); *A23L 1/293* (2013.01); *A23L 1/296* (2013.01); *A23L 1/307* (2013.01); *A23V 2002/00* (2013.01)

(58) Field of Classification Search
None
See application file for complete search history.

(56) References Cited

U.S. PATENT DOCUMENTS

| | | | |
|---|---|---|---|
| 4,704,291 A * | 11/1987 | Nagasaki | A23L 1/3255 426/513 |
| 4,806,378 A | 2/1989 | Ueno et al. | |
| 5,028,444 A | 7/1991 | Yamamoto et al. | |
| 5,141,766 A | 8/1992 | Miyakawa | |
| 5,223,301 A | 6/1993 | Kanda et al. | |
| 2007/0172575 A1* | 7/2007 | Gune | 426/641 |

OTHER PUBLICATIONS

Omega 6 and 3 in nuts, oils, meats, and fish. Tools to get it right, posted online May 10, 2011.*
The Fat Content of Fish, available online 2004.*
Rolls et al.,"How Flavour and Appearance Affect Human Feeding", Proceedings of the Nutrition Society, Jun. 1982, pp. 109-117, vol. 41, 109, Great Britain.

(Continued)

*Primary Examiner* — Robert A Wax
*Assistant Examiner* — Melissa Mercier

(57) ABSTRACT

An edible product including surimi, fish or fish portions, in various pasta-like shapes. The edible product has a high satiety index relative to unprocessed cooked fish and also provides a low glycemic index when compared to conventional pasta. Also disclosed is a method of manufacturing the edible product in various pasta-like shapes. The product may include between 1%-25% protein, between 1%-20% fat, and a ratio of Omega 3 to Omega 6 of at least 5:1.

18 Claims, 7 Drawing Sheets

(56) References Cited

OTHER PUBLICATIONS

Thexton et al, "Food Consistency and Bite Size as Regulators of Jaw Movement During Feeding in the Cat", Journal of Neurophysiology, Sep. 1980, pp. 456-474, vol. 4, The American Physiological Society, USA.

Tarozzi et al., "Correlation Between Food and the Fluid Intake", International Conference on the Physiology of Food and Fluid Intake in Warsaw, 1980.

Rahul, Kuma, "Surimi Technology", Oct. 14, 2010, retrieved on Feb. 6, 2015 from <<http://www.scribd.com/doc/39341260/Surimi-Technology>>.

* cited by examiner

Plain sea food pasta

| | Per 100g | Per Serving | Daily Value (DV) |
|---|---|---|---|
| Calories | 164 | 230 | |
| Calories from Fat | 93 | 130 | |
| Fat | 10.32 g | 14 g | 22 % |
| Protein | 8.27 g | 12 g | |
| Moisture | 68.97 g | | |
| Ash | 2.91 g | | |
| Total Carbohydrates | 9.53 g | 13 g | 4 % |
| Dietary Fiber | 1.5 g | 2 g | 8 % |
| Sugars | 1.7 g | 2 g | |
| Cholesterol | 9 mg | 15 mg | 5 % |
| Saturated Fat | 12 % of Fat | 1.5 g | 8 % |
| Monounsaturated Fat | 26 % of Fat | 4 g | |
| Polyunsaturated Fat | 62 % of Fat | 9 g | |
| Trans Fat | 0 % of Fat | 0 g | |
| Sodium | 1100 mg | 1540 mg | 64 % |
| Iron | 0.46 mg | 0.64 mg | 4 % |
| Vitamin A | 23.0 I.U. | 32 I.U. | 0 % |
| Vitamin C | 1.0 mg | 1.4 mg | 2 % |
| Calcium | 34 mg | 48 mg | 4 % |

Nutrition Facts

Serving Size 5 oz (140 g)
Servings per Container UNSPECIFIED

Amount Per Serving

Calories 230    Calories From Fat 130

% Daily Value *

| | |
|---|---|
| Total Fat 14g | 22 % |
| Saturated Fat 1.5g | 8 % |
| Trans Fat 0g | |
| Cholesterol 15mg | 5 % |
| Sodium 1540mg | 64 % |
| Total Carbohydrate 13g | 4 % |
| Dietary Fiber 2g | 8 % |
| Sugars 2g | |
| Protein 12g | |

Vitamin A  0 %   •   Vitamin C  2 %
Calcium    4 %   •   Iron        4 %

* Percent Daily Values are based on a 2,000 calorie diet. Your daily values may be higher or lower depending on your calorie needs.

| | Calories: | 2,000 | 2,500 |
|---|---|---|---|
| Total Fat | Less than | 65g | 80g |
| Sat Fat | Less than | 20g | 25g |
| Cholesterol | Less than | 300mg | 300mg |
| Sodium | Less than | 2,400mg | 2,400mg |
| Total Carbohydrate | | 300g | 375g |
| Dietary Fiber | | 25g | 30g |

Calories per gram:
Fat 9   •   Carbohydrate 4   •   Protein 4

*Figure 3A*

Fish pasta with prawns

|  | Per 100g | Per Serving | Daily Value (DV) |
|---|---|---|---|
| Calories | 173 | 240 |  |
| Calories from Fat | 104 | 150 |  |
| Fat | 11.60 g | 16 g | 25 % |
| Protein | 10.26 g | 14 g |  |
| Moisture | 68.54 g |  |  |
| Ash | 2.65 g |  |  |
| Total Carbohydrates | 6.95 g | 10 g | 3 % |
| Dietary Fiber | 0.9 g | 1 g | 5 % |
| Sugars | 0.9 g | 1 g |  |
| Cholesterol | 59 mg | 85 mg | 28 % |
| Saturated Fat | 12 % of Fat | 2 g | 10 % |
| Monounsaturated Fat | 26 % of Fat | 4.5 g |  |
| Polyunsaturated Fat | 60 % of Fat | 10 g |  |
| Trans Fat | 0 % of Fat | 0 g |  |
| Sodium | 970 mg | 1360 mg | 57 % |
| Iron | 0.99 mg | 1.38 mg | 8 % |
| Vitamin A | 0.00 I.U. | 0 I.U. | 0 % |
| Vitamin C | 1.0 mg | 1.4 mg | 2 % |
| Calcium | 38 mg | 53 mg | 6 % |

*Figure 3B*

Nutrition Facts

Serving Size 5 oz (140g)
Servings per Container UNSPECIFIED

Amount Per Serving

Calories 340        Calories From Fat 150

% Daily Value *

| Total Fat 16g | 25 % |
| Saturated Fat 2g | 10 % |
| Trans Fat 0g |  |
| Cholesterol 85mg | 28 % |
| Sodium 1360mg | 57 % |
| Total Carbohydrate 10g | 3 % |
| Dietary Fiber 1g | 5 % |
| Sugars 1g |  |
| Protein 14g |  |

Vitamin A   0 %   • Vitamin C   2 %
Calcium   6 %   • Iron   8 %

* Percent Daily Values are based on a 2,000 calorie diet. Your daily values may be higher or lower depending on your calorie needs.

|  |  | Calories: | 2,000 | 2,500 |
|---|---|---|---|---|
| Total Fat | Less than | 65g | 80g |
| Sat Fat | Less than | 20g | 25g |
| Cholesterol | Less than | 300mg | 300mg |
| Sodium | Less than | 2,400mg | 2,400mg |
| Total Carbohydrate |  | 300g | 375g |
| Dietary Fiber |  | 25g | 30g |

Calories per gram:
Fat 9   • Carbohydrate 4   • Protein 4

SPAGHETTI-LIKE FISH PRODUCTS, METHODS OF MANUFACTURE THEREOF

FIELD OF THE INVENTION

The present invention generally pertains to pasta-like edible products, especially spaghetti-like products made of fish, fish products and Surimi and to methods of manufacture of same.

BACKGROUND OF THE INVENTION

Fish and fish products are consumed all over the world. With other seafood's, it provides the world's prime source of high-quality protein 14 to 16 percent of the animal protein consumed worldwide. Over one billion people rely on fish as their primary source of animal protein.

Fish and other aquatic organisms are also processed into various food and non-food products.

Fish and fish products are versatile and may be minced, frozen, chopped, formed, cooked, fermented, boiled, fried, breaded and processed in many ways.

Surimi is a paste made by fish or other meat, as well as multiple Asian foods that use Surimi as its primary ingredient. It is available in many shapes, forms, and textures, and often used to mimic the texture and color of the meat of lobster, crab and other shellfish. The most common Surimi product in the Western market is imitation crab meat. Such a product often is sold as imitation crab and mock crab in America, and as seafood sticks, crab sticks, fish sticks or seafood extender in Commonwealth nations. In Britain the product is sometimes known as Ocean sticks, to avoid trading standards issues regarding misadvertisement. In current production processes, lean meat from fish or land animals is first separated or minced. The meat then is rinsed numerous times to eliminate undesirable odors. The result is beaten and pulverized to form a gelatinous paste. In North America and Europe, Surimi also alludes to fish-based products manufactured using this process.

U.S. Pat. No. 5,141,766 discloses Surimi which consists essentially of the meat of catfish produced through a Surimi manufacturing process comprising the steps of mincing the meat of catfish after filleting, rinsing the minced meat, dehydrating the rinsed meat, adding condensed phosphates to the meat and mixing them together, grinding the mixture, and if desired, freezing the mixture.

U.S. Pat. No. 5,028,444 discloses a frozen Surimi product which comprises frozen Surimi and, as an effective ingredient, a mixture consisting essentially of sodium bicarbonate, calcium citrate and calcium lactate.

U.S. Pat. No. 4,806,378 discloses a method of producing frozen Surimi comprising: washing minced fish meat with a water solution, said solution containing one salt selected from the group consisting of calcium salts, magnesium salts and any combination thereof; dehydrating the washed minced fish meat; adding surface active agents to the dehydrated minced fish meat; and then freezing the resultant Surimi.

U.S. Pat. No. 5,223,301 discloses a process to produce higher grade Surimi from the flesh of fish using less fresh water comprising: mincing fish flesh into mince particles; crushing the mince particles to increase the surface area: volume ratio of the mince particles; washing the crushed mince particles with fresh water to remove water soluble proteins; dewatering the washed mince particles; refining by straining the dewatered mince particles; dewatering the refined mince particles; and mixing additives with the refined dewatered mince particles to produce Surimi.

Roll B. J. et al., How flavour and appearance affect human feeding. *Proc. Nutr. SOC.* (1982), 41, 109 argues that appearance of food can vary is in its shape. Changes in shape also alter the feel of food in the mouth and it is known that food consistency and bite size determine the jaw movements during feeding, see Thexton, A. J., Hiiemae, K. M. & Crompton, A. W. (1980). *J. Neurophysiol.* 44,456. It has been suggested that the muscle and neural activity associated with mastication play an important role in food preference and may affect the amount of food eaten. The shape and size of food pellets offered to rats have been found to affect food intake, see Tarozzi, G., Di Bella, L., Scalera, G. & Rossi, M. T. (1980); in Proceedings of the Seventh International Conference on the Physiology of Food and Fluid Intake, Warsaw. To determine whether shape is also an important influence on feeding in humans, Roll et al. assessed the effect of offering a variety of shapes of food on total energy intake in a meal. The foods used were different shapes of pasta served with equal portions of tomato sauce. Subjects were tested twice, once with just the favorite shape repeatedly presented, and once with three different shapes (spaghetti, bow ties and hoops) presented in three successive courses. Roll et al., have found that there was a significant enhancement (~14%, $P<0.07$) of intake with the variety of shapes. In the condition in which just one shape was presented it was found that the pleasantness of the food eaten decreased more than that of the foods not eaten and this could explain why the variety of shapes increased energy intake.

Thus it is a long felt need to provide edible products made of fish, fish products and Surimi products easily adaptable to a wide variety of tastes.

SUMMARY OF THE INVENTION

It is an object of the present invention to provide an edible product comprising surimi, fish or portions thereof, said product characterized as a pasta, and especially as spaghetti-like shape.

It is an object of the present invention to provide a low-carbohydrate, edible product comprising surimi, fish or portions thereof, said product characterized as pasta-like shape.

It is an object of the present invention to provide a carbohydrate-free edible product comprising Surimi fish or portions thereof, said product characterized as a pasta-like shape.

It is a further object of the present invention to provide the aforementioned edible product comprising surimi, fish or portions thereof wherein said pasta-like shape is characterized by a like long thin cylindrical shape with a solid central core.

It is a further object of the present invention to provide the aforementioned edible product comprising surimi, fish or portions thereof, said pasta-like shape characterized by a solid central core, a main longitudinal axis of about 1 to about 30 cm length and diameter ranges from about 1 mm to about 6 mm.

It is a further object of the present invention to provide the aforementioned edible product comprising surimi, fish or portions thereof, said pasta-like shape characterized by a main non-solid core a main longitudinal axis of about 1 to about 30 cm length and diameter ranges from about 1 mm to about 30 mm.

It is a further object of the present invention to provide the aforementioned edible product comprising surimi, fish or portions thereof, said pasta-like shape characterized by having the same cross-sectional area.

It is a further object of the present invention to provide the aforementioned edible product comprising surimi, fish or portions thereof, said pasta-like shape characterized by a main longitudinal axis of about 5 to about 50 cm and by a main latitudinal axis of about ranges from about 3 mm to about 200 mm.

It is a further object of the present invention to provide the aforementioned edible product comprising surimi, fish or portions thereof, said pasta-like can have different colors.

It is a further object of the present invention to provide the aforementioned edible product comprising surimi, fish or portions thereof, said pasta-like shape characterized by any of the shape types of pasta defined here.

It is a further object of the present invention to provide the aforementioned edible product comprising surimi, fish or portions, wherein said pasta-like shape is formed by a method selected from the group consisting of extrusion, co-extrusion, forming, molding, composite molding, fiberizing, forming into a pasta or spaghetti or any combination thereof.

It is a further object of the present invention to provide the aforementioned edible product comprising surimi, fish or portions, wherein said product additionally comprises food additives selected from the group consisting of starch, egg white, salt, vegetable oil, humectants, sorbitol, sugar, gelling agents, soy protein, seasonings, transglutaminases, monosodium glutamate, food enhancers, food colorants, food flavorings and any combination thereof.

It is a further object of the present invention to provide the aforementioned edible product comprising surimi, fish or portions thereof, wherein said Surimi comprises any fish selected from the group consisting of Alaska pollock (*Theragrachalcogramma*), Atlantic cod (*Gadusmorhua*), Big-head pennah croaker (*Pennahiamacrocephalus*), Bigeyes (*Priacanthusarenatus*), Golden threadfin bream (*Nemipterusvirgatus*), Milkfish (*Chanoschanos*), Pacific whiting (*Merluciusproductus*), shark, Swordfish (*Xiphiasgladius*), Tilapia (*Oreochromismossambicus, Oreochromisniloticus*), Atlantic salmon (*Salmo salar*), Chum salmon (*Oncorhynchus keta*), King salmon (*Oncorhynchus tshawytscha*), Coho salmon (*Oncorhynchus kisutch*), Pink salmon (*Oncorhynchus gorbuscha*), Sockeye salmon, Skipjack tuna, White fish, Lake whitefish, Whiting (*Merluccius Hubbsi*) or any combination thereof.

It is a further object of the present invention to provide the aforementioned edible product comprising surimi, fish or portions thereof, wherein any parameters selected from the group consisting of organoleptically perceivable flavour, mouth-acceptance, mouth feel and taste correlate with predetermined shape and/or dimension of said product, for a given recipe.

It is a further object of the present invention to provide the aforementioned edible product comprising surimi, fish or portions, wherein said product is adapted for freezing and refrigeration.

It is a further object of the present invention to provide the aforementioned edible product comprising surimi, fish or portions thereof, wherein said product additionally comprises cryoprotectants.

It is yet a further object of the present invention to provide the aforementioned edible product comprising fish or portions thereof, wherein said product has a calorific content of about 50 calories to about 500 calories per 100 g of product.

It is yet a further object of the present invention to provide the aforementioned edible product comprising fish or portions thereof, wherein said product has from about 5% to about 25% protein.

It is a further object of the present invention to provide the aforementioned edible product useful for inducing ketogenic metabolism in a patient thereof, said product comprising surimi, fish or portions thereof formed as a pasta-like shape, comprising from about 5% to about 25% protein and from about 1% to about 20% fat.

It is a further object of the present invention to provide the aforementioned edible product characterized by an Omega 3 to Omega 6 ratio of at least 5:1 wherein said comprising surimi, fish or portions thereof formed as a pasta-like shape, comprising from about 5% to about 25% protein and from about 1% to about 20% fat.

It is an object of the present invention to provide a high satiety index edible product, comprising: an edible product comprising fish or portions thereof, said product characterized as a pasta-like shape wherein said product provides an increased satiety index relative to unprocessed cooked fish and wherein said product provides a low glycemic index compared to conventional pasta.

It is an objective of the present invention to disclose a method of manufacturing an edible product comprising surimi, fish or portions comprising steps of providing surimi, fish or portions thereof and forming said surimi, fish or portions thereof to a pasta-like shape or dimension by any process selected from the group consisting of extruding, coextruding, molding, Composite molding, Fiberizing wherein standardized, mouth-acceptance and taste are correlated with predetermined shape and/or dimension of said product, for a given recipe.

It is a further objective of the present invention to disclose the aforementioned method of comprising steps of forming said pasta-like shape with a long thin cylindrical shape with a solid central core and main longitudinal axis of about 1 to about 30 cm and diameter ranges from about 1 mm to about 6 mm.

It is a further objective of the present invention to disclose the aforementioned method of comprising steps of forming said pasta-like shape with a long thin cylindrical shape with a non-solid central core and main longitudinal axis of about 1 to about 30 cm and diameter ranges from about 1 mm to about 30 mm.

It is a further objective of the present invention to disclose the aforementioned method of comprising steps of forming said pasta-like shape having the same cross-sectional area.

It is a further objective of the present invention to disclose the aforementioned method of comprising steps of said pasta-like shape characterized by a main longitudinal axis of about 5 to about 50 cm and by a main latitudinal axis of about ranges from about 3 mm to about 200 mm.

It is a further objective of the present invention to disclose the aforementioned method wherein said edible product comprising fish or portions comprises food additives selected from the group consisting of starch, egg white, salt, vegetable oil, humectants, sorbitol, sugar, gelling agents, soy protein, seasonings, transglutaminases, monosodium glutamate, food enhancers, food colorants, food flavorings and any combination thereof.

It is a yet further objective of the present invention to disclose the aforementioned method wherein said edible product comprising fish or portions comprises any fish selected from the group consisting of Alaska pollock (*Theragrachalcogramma*), Atlantic cod (*Gadusmorhua*), Big-head pennah croaker (*Pennahiamacrocephalus*), Bigeyes (*Pria-

*canthusarenatus*), Golden threadfin bream (*Nemipterusvirgatus*), Milkfish (*Chanoschanos*), Pacific whiting (*Merlucciusproductus*), shark, Swordfish (*Xiphiasgladius*), Tilapia (*Oreochromismossambicus, Oreochromisniloticus*), Atlantic salmon (*Salmo salar*), Chum salmon (*Oncorhynchus keta*), King salmon (*Oncorhynchus tshawytscha*), Coho salmon (*Oncorhynchus kisutch*), Pink salmon (*Oncorhynchus gorbuscha*), Sockeye salmon, Skipjack tuna, White fish, Lake whitefish, Whiting (*Merluccius Hubbsi*) or any combination thereof.

It is moreover a still further objective of the present invention to disclose the aforementioned method comprising steps of freezing said edible product.

It is moreover a still further objective of the present invention to disclose the aforementioned method comprising steps of dehydrating said edible product.

It is another objective of the present invention to disclose the aforementioned method comprising steps of adding cryoprotectants.

It is a yet further objective of the present invention to disclose the aforementioned method comprising steps of adding Surimi and forming the fish or fish portions to a pasta-like shape or dimension by any process selected from the group consisting of extruding, coextruding, molding, composite molding, fiberizing wherein standardized, mouth-acceptance and taste are correlated with predetermined shape and/or dimension of said product, for a given recipe.

A method of inducing a physiologically acceptable ketosis such as to treat a patient in need of therapy for one or more of amylotrophic lateral sclerosis, and Duchenne's muscular dystrophy comprising oral administration to said patient of a ketogenic diet comprising administering portions of an edible product comprising surimi, fish or portions thereof, said product characterized as a pasta-like shape with from about 5% to about 25% protein and from about 1% to about 20% fat, further wherein the physiologically acceptable ketosis is characterized by blood levels of (R)-3-hydroxy-butyrate of from about 0.5 to about 20 mM.

It is a yet further objective of the present invention to disclose a method of maintaining or increasing muscle mass and/or muscle strength in a mammalian subject, the method comprising providing to the mammalian subject a sufficient amount of a nutritive composition comprising comprises the following properties: a simulated gastric digestion half-life of less than about 60 minutes. It is a yet further objective of the present invention to disclose a method of supplementing the diet of an individual comprising a step of administering to an individual an edible product comprising fish or portions thereof, said product characterized as a spaghetti-like shape wherein said edible product is administered to said individual about 0 to about 60 minutes following a workout.

It is a yet further objective of the present invention to disclose a method of at least partially reversing weight gain, comprising: identifying an individual who experienced or who is experiencing weight gain; and administering to the individual an edible product comprising fish or portions thereof, said product characterized as a pasta-like shape, wherein said edible product is ketogenic and comprises from about 5% to about 25% protein and from about 1% to about 20% fat.

BRIEF DESCRIPTION OF THE FIGURES

FIGS. 3A-3B shows nutritional facts of two embodiments of the invention, namely Plain sea food pasta and Fish pasta with prawns.

DETAILED DESCRIPTION OF THE FIGURES AND EMBODIMENTS

Figure 1A:
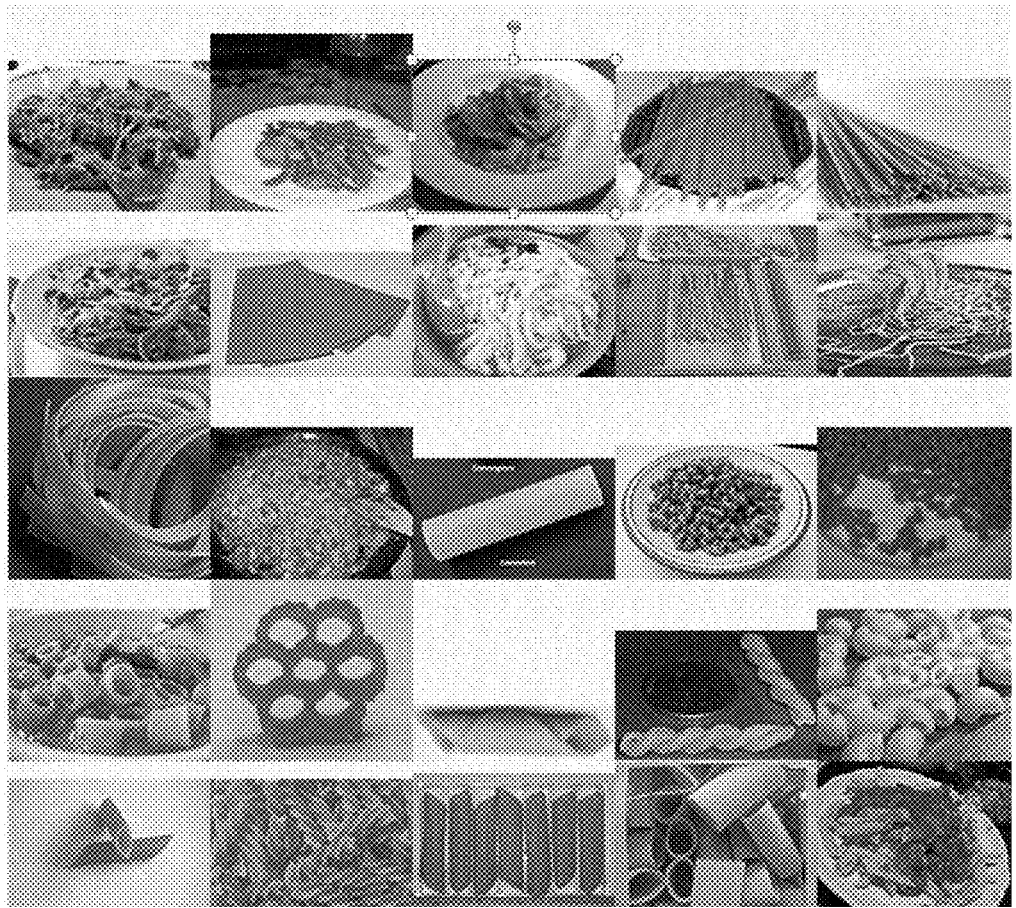
FIGS. 1A-1D illustrate in a non-limiting manner various shapes and type, as well as examples for serving Spaghetti-like products comprising fish, fish products or Surimi according to a few embodiments of the present invention.
Figure 1B:
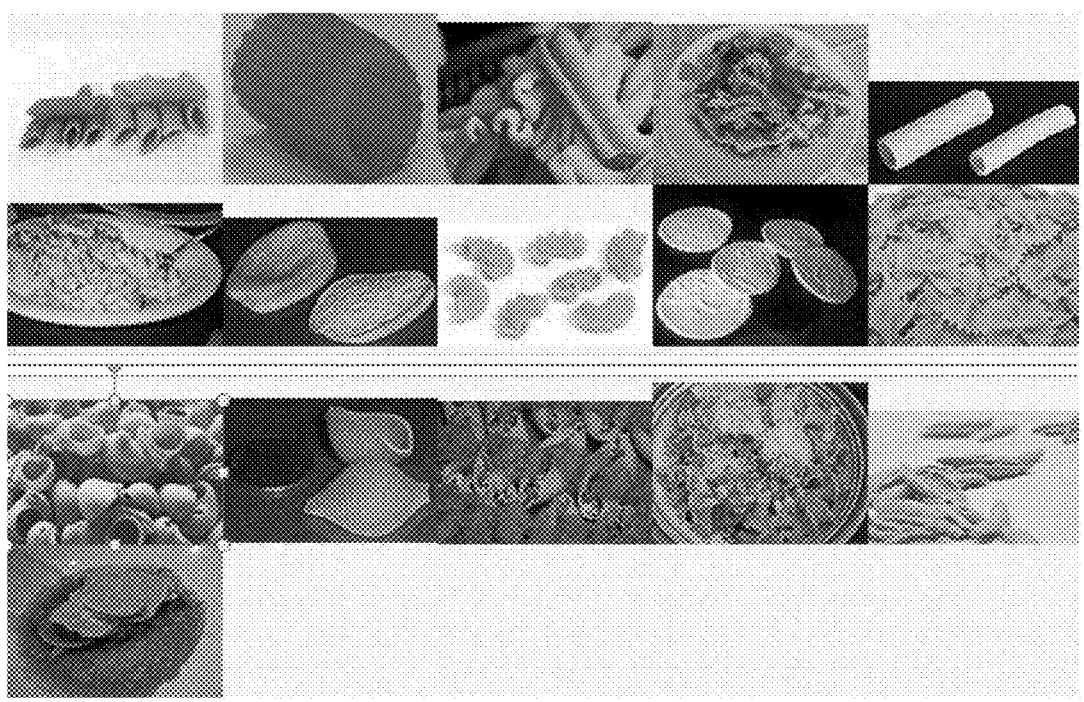
Figure 1C:
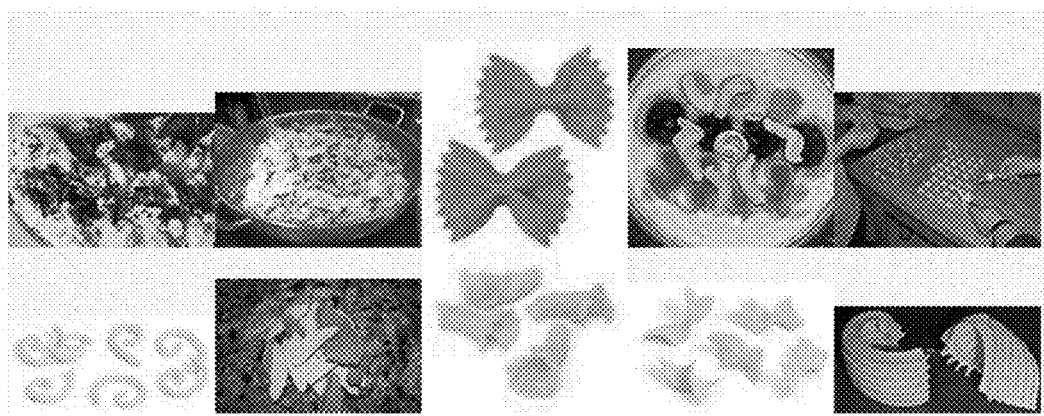
Figure 1D:
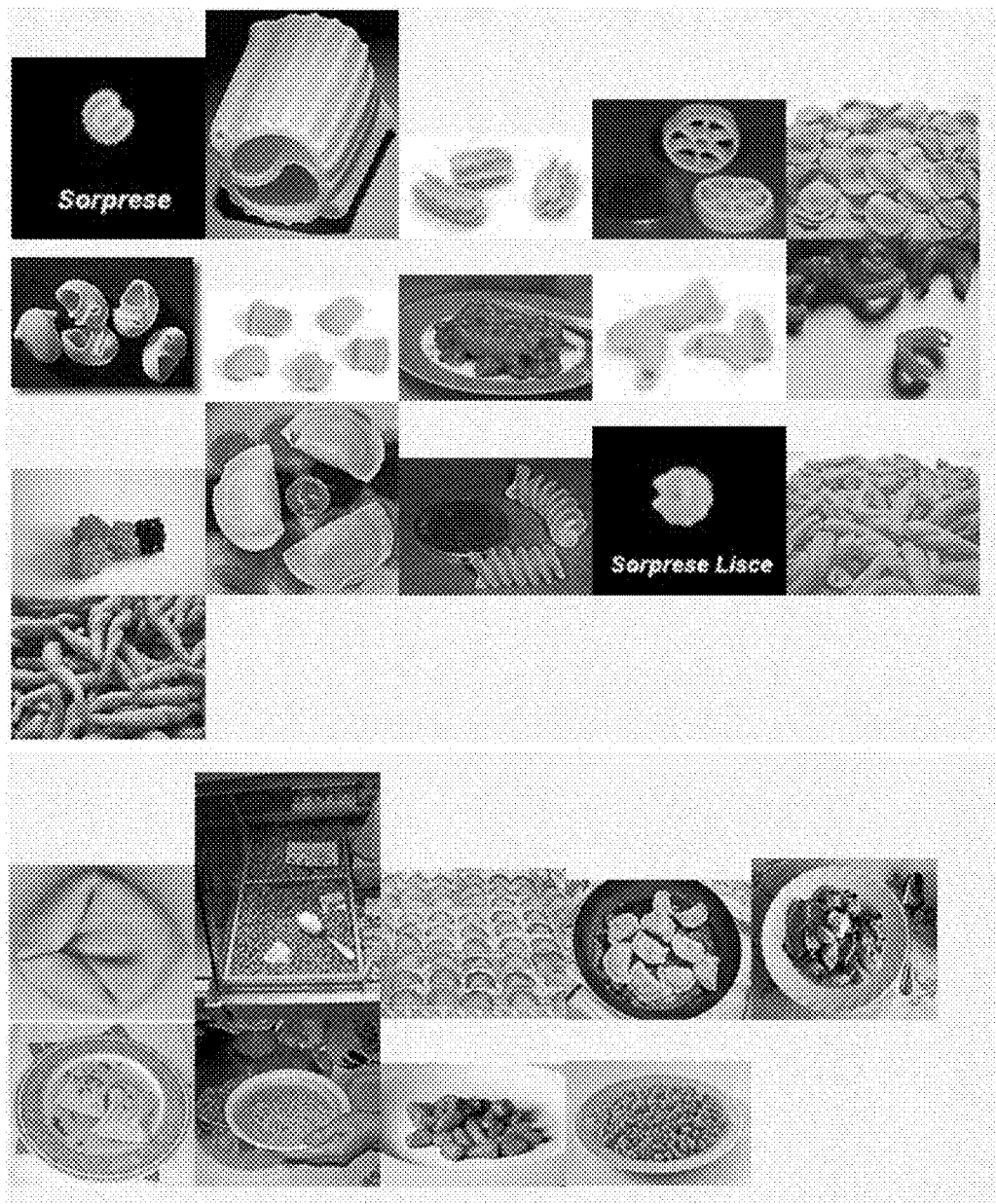

The following description is provided so as to enable any person skilled in the art to make use of the invention and sets forth the best modes contemplated by the inventor of carrying out this invention. Various modifications, however, will remain apparent to those skilled in the art, since the generic principles of the present invention have been defined specifically to provide an edible product comprising fish or portions thereof, said product characterized as pasta, e.g., a spaghetti-like shape. In some embodiments of the present invention a Surimi edible product, characterized as a spaghetti-like shape is provided. Furthermore, the Surimi edible product is so formed and constructed that standardized; mouth-acceptance and taste are correlated with predetermined shape and/or dimension of said product, for a given Surimi recipe.

It is well known that spaghetti and pasta are extremely popular and versatile foods, beloved by all age groups, including children. Spaghetti and pasta are high carbohydrate comfort foods, having high satiety and satiation values, and therein lies their attraction. It is also a well established fact that the high consumption of carbohydrate rich foods such as spaghetti and pasta in the western world is a contributor to the increasing obesity of the population and the attendant complications such as increased risk of diabetes, heart disease and stroke.

It is a core feature of the present invention to provide a novel type of pasta which, whilst being in the form of pasta, is less carbohydrate rich, provides lower calories, and with a lower glycemic index, and less harmful in contributing to insulin resistance and diabetes. Consumers of this new pasta of the present invention, which is made of surimi and/or other fish products, will provide a product which has a pleasing mouth feel and food acceptance, reminiscent at least in part of traditional pasta. Special features of the product of the present invention include a texture which is at Dente, defined as firm to the bite, which is what most people desire when they anticipate consuming pasta. Another very highly beneficial feature of the present invention is the low glycemic index of the product compared to carbohydrate rich traditional or conventional pasta. A yet further advantage of the present invention is that it provides a fish product which is perceived as being more satisfying to eat than fish itself among people who have a dislike of fish, either due to the fishy odour, or texture of fish or other sea food, since the novel pasta of the present invention is prepared by a process which ensures a far less fishy odour and cooked fish texture to the product. A further, and very major advantage of the present invention is that the novel product provides a high satiety index in comparison to cooked fish which has not been processed in this way and formed into the novel pasta. This means that a satisfying meal comprising a portion of the novel pasta of the present invention can be provided to the diner who does not usually like fish, and the portion will be of a higher satiety than a cooked fish portion, with a lower glycemic index, lower calorific value and more healthful than regular, conventional or traditional pasta.

The term 'fish or fish products' refers hereinafter to one or more members of a group including processed fish, pieces of fish, minced fish, ground fish, fish portions, pulverized fish, fish meal, hydrolyzed fish, deboned fish, fish blocks, fish fillets, fish trimmings, fish offal, raw fish, fish paste, cured fish, cooked fish or any other fish product. The fish or fish products can be preserved, frozen dried, partially dried, or reconstituted or mixed with any other edible product. The fish, fish portions or fish products can be used, in the present invention, to provide spaghetti-like products alone, or in conjunction with or instead of Surimi.

The term 'additives' refers herein after to one or more members of a group consisting of starch such as potato starch, egg white, salt, vegetable oil, humectants, sorbitol, sugar, soy protein, seasonings, edible biocides, edible acids, enhancers such as trans-glutaminases and monosodium glutamate (MSG), flavors, cryo-protectants as preservatives while the meat paste is being mixed and cooled. It is in the scope of the invention wherein the salt (NaCl) is added (e.g., during final washing) to increase the ionic strength of meat, thereby, solubilizing actomyosin (the active component which forms gel) and that the optimum level is about 2% at pH 7.0. It is in further the scope of the invention wherein sugar (e.g., sucrose, lactose, glucose, fructose, glycerol and sorbitol) acts, as cryo-protectant and sweetener, and thus protects protein from freeze denaturation by increasing the surface tension of water as well as the amount of bound water. It is in further the scope of the invention wherein egg white modifies the rubbery texture caused by the addition of starch and to give the product a whiter and glossier appearance. Hence for example, about 10% addition imparts highest yield stress to the gel product and 20% addition gives a softer product with higher gel quality. It is in further the scope of the invention wherein phosphates are added to wash minced flesh before freezing. Phosphates used in conjunction with sugar or sorbitol and with or without salt. It enhances the cryo-protective effect of sugar. Increased in water retention is another function of phosphates. It is in further the scope of the invention wherein DSP, STP, SHMP etc. are used in at about 0.1 to about 0.3% by weight. It is in further the scope of the invention wherein starch is used to modify the texture of final product, improve gel strength of a low quality Surimi and reduce the cost of the formulation due to imbibed water (e.g., due to the gelatinization of the starch granules). Up to about 10% starch can be added. In excess, it causes Surimi products brittleness. It is in further the scope of the invention wherein colour and flavour additives are utilized in the manufacture of the product. Hence, Analog crab is added to provide orange-red surface colour that is associated with the real product. Similarly yellow color is added to white flesh to get creamy white for scallops. It is in further the scope of the invention wherein Hydrolyzed proteins, either as peptides or amino acids, are used as flavoring agents. MSG is basically an amino acid, but used as a flavor modifier and enhancer. Several artificial flavors are available for seafood analogs, compounds with the flavor of tuna, caviar, scallop, oyster, shrimp, crab, lobster, and anchovy are used.

It is well within the scope of the invention wherein the hereto described edible product is provided in one color, or alternatively in two colors or more. It is also in the scope of the invention wherein the edible product is provided in true color, namely the color of the original food product, its sauce etc.

The glycemic index or glycaemic index (GI) is a number associated with a particular type of food that indicates the food's effect on a person's blood glucose (also called blood sugar) level. The number typically ranges between 50 and 100, where 100 represent the standard, an equivalent amount of pure glucose.

'Al dente' is a description relating to the firmness (or texture) of cooked pasta, but how sticky the product is also has a critical influence on the consumer's perception of the perfect serving. Traditionally, a technician simply pinched a sample piece between their fingers to make a subjective decision. Despite being highly-trained, the method results in variation so an objective way of measuring the stickiness is needed. A food texture analyzer provides a repeatable test in order to better understand the effect of processing and cooking times on quality of the product.

In the present invention, the al dente texture of the product is either measured manually or by using equipment such as a Food Technology Corporation (FTC) TMS-Pro Texture Analyzer fitted with a 500 N intelligent loadcell and a 75 mm diameter compression plate.

Example 1

Figure 2A:
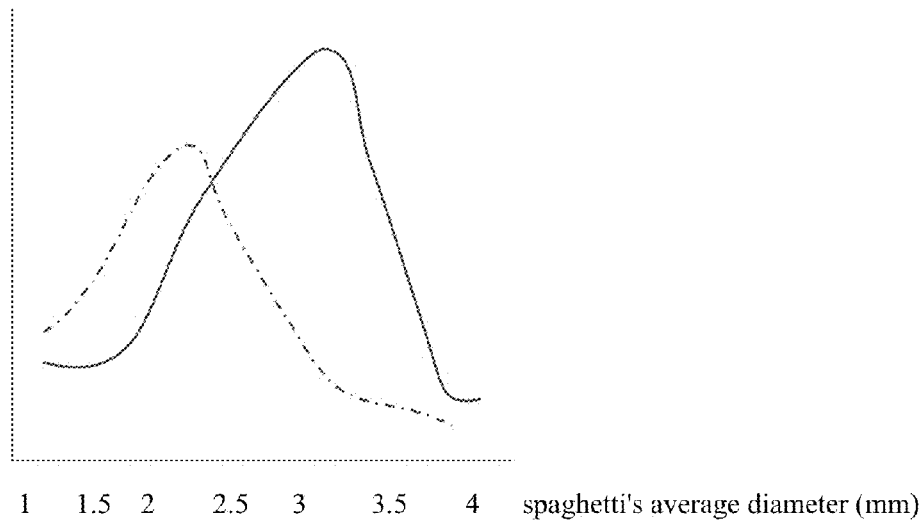
FIGS. 2A-2B illustrate in a non-limiting manner organoleptic characteristics of the present invention.

It is an aspect of the present invention to provide the novel edible product formed from surimi, fish or fish-like products into pasta-like or noodle-like forms or shapes. Reference is now made to experiments, such as the example below (FIG. 2a), which demonstrates that the edible products and methods for producing them of the present invention provides pasta-like, spaghetti-like or noodle-like foods from the same starting material or recipe, with a predetermined acceptance value, depending only on the diameter of the extrusion or other shape and/or dimensional parameters.

A single blind random test (24 Israeli volunteers, average age 36) defines a factorized food's acceptance value of seven fish products which were formed into noodle-like elongated and thin extruded products. The fish product was made from Alaska pollock (*Theragrachalcogramma*). Each of the products had a main longitudinal axis of about 7 cm and diameter ranges from about 1 mm to 4 mm. A short questionnaire was used to assess the factorized food acceptance of the noodle-like fish products as either or both (i) Chinese style noodle, and (ii) Italian style noodle (spaghetti). FIG. 1 illustrates that whilst Italian style noodle are to be accepted in case of elongated noodles, respectively wide diameter, D=3 mm (±0.75 mm), Chinese style noodles are to be accepted in case of respectively small diameter, D=2 mm (±0.5 mm).

Similar fish-containing ingredients, identical dressing, flavors and length thus show different taste, flavor and mouth acceptance when the diameter of noodle-like fish products is altered. Moreover, food verity is achieved by minor physical changes and increase food suitability parameters towards special requirement and traditional tastes.

Example 2

Figure 2B:
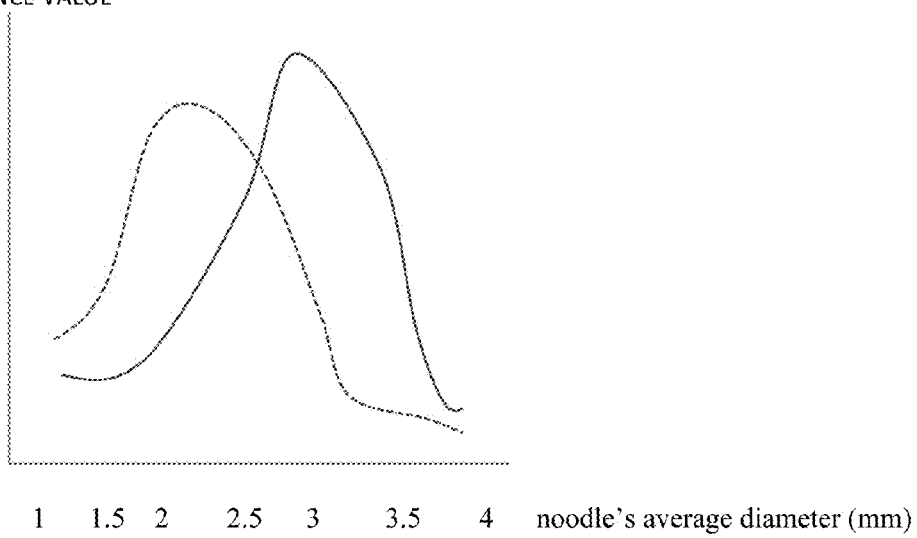

It is an aspect of the present invention to provide the novel edible product formed from Surimi into spaghetti-like or noodle like forms or shapes. Reference is now made to experiments, such as the example below (FIG. 2b), which demonstrates that the edible products and methods for producing them of the present invention provides spaghetti like or noodle like foods from the same Surimi starting material or recipe, with a predetermined acceptance value, depending only on the diameter of the extrusion or other shape and/or dimensional parameters.

A single blind random test (24 Israeli volunteers, average age 36) defines a factorized food's acceptance value of seven Surimi-extruded noodle-like elongated and thin extruded products. The Surimi was made from Alaska pollock (*Theragrachalcogramma*). Each of the products had a main longitudinal axis of about 7 cm and diameter ranges from about 1 mm to 4 mm. A short questionnaire was used to assess the factorized food acceptance of the noodle-like Surimi products as either or both (i) Chinese style noodle, and (ii) Italian style noodle (spaghetti).

FIG. 1 illustrates that whilst Italian style noodle are to be accepted in case of elongated noodles, respectively wide diameter, D=3 mm (±0.75 mm), Chinese style noodles are to be accepted in case of respectively small diameter, D=2 mm (±0.5 mm).

Similar fish-containing ingredients, identical dressing, flavors and length thus show different taste, flavor and mouth acceptance when the diameter of noodle-like Surimi is altered. Moreover, food verity is achieved by minor physical changes and increase food suitability parameters towards special requirement and traditional tastes.

Example 3

In the following example, a non limiting method of providing the product of the present invention is disclosed.

In this case spaghetti is made from squid or fish mixed with squid based Surimi; Steps include:
1. Chopping frozen surimi to chips.
2. Introducing the surimi chips in a ratio described in a predetermined ratio using grade A, AA or FA.
3. Adding cold water and salt is added and the mixture is homogenized in at a speed of about 2000 to about 5500 (e.g., 3550) rounds/minute under vacuum for about 1 to about 5 (e.g., 2.5) minutes until and homogenized mass is produced.
4. Adding a protein mixture (mixture A); homogenizing.
5. Adding a hydrocolloid mixture (mixture B); homogenizing.
6. Adding a starch mixture (mixture C); homogenizing.
7. Adding vegetable oil and homogenizing to a homogenic emulsion in a maximal temperature of about 8 degrees Celsius.
8. Injecting the mass to a special molding head which give the Refrigerating the mass for at least about 6 hours before introducing to production.
9. Massing a predetermined shape. The process is carried out under low pressure of no more than about 2 bar. According to yet another embodiment of the invention, the process is carried out under low pressure of no more than about 5 bar. According to yet another embodiment of the invention, the process is carried out under low pressure of no more than about 15 bar. The desired texture (Al Dente) is determined manually or by using a food texture analyzer.
10. The pasta is cooled to about 4 degrees Celsius to about 6 degrees Celsius, e.g., about 4 hours.

Surimi Blocks are preferably about 16 to 17% protein, 0 to about 1% fat; water content of about 75-80%; sorbitol up to about 0.3%; characteristic colour-beige. Grey is avoided. The temperature is not raised above about 4 G degrees Celsius to about 10-G degrees Celsius (e.g., 8 C) by the end of the production. The maximal pressure in molding is about −2 Barr. Cooling time is at least about 6 hours. The molded pasta is transported on a conveyor belt heated to about 40 to about 50 degrees Celsius during all the cooking period, under dry cooking conditions of about 120 degrees Celsius. Maximal cooling temperature reaches no more than about 4 hours from the beginning of cooking Cooling is carried out in cold water (about 0 to about 3 degrees Celsius). Hence, a (a) low-carbohydrate or (b) a carbohydrate-free edible product comprising Surimi, fish or portions thereof, characterized as a spaghetti-like shape is provided.

It is an object of the present invention to provide a carbohydrate-free edible product comprising Surimi fish or portions thereof, said product characterized as a pasta-like shape.

The terms "Fishy odour" and "Fishy smell" refer to the unpleasant smell that people who are not fond of fish often refer to. It is not necessarily an indicator of fish spoilage, yet an important number of people refrain from fish consumption because of it. The present invention discloses steps of substantially reducing the fishy odour by rinsing the starting surimi or fish blocks or chipped fish blocks with water at about 0 to about 3 degrees Celsius, at least twice. The fishy odour is reduced from portions of the spaghetti or pasta product of the present invention as measured by sensory methods or biochemical methods compared to a portion of the same fish not so processed.

The terms 'Pasta-like/Spaghetti-like fish or portions thereof or fish products' refers hereinafter in a non-limiting manner to a fish only product or a fish-containing edible product shaped e.g., in one or more elongated or rounded or twisted or chopped or tied or folded shapes, such as those selected from a group consisting of Spaghetti-like shape, namely a long, thin, cylindrical, pseudo-cylindrical or polygonal cross section; noodle-like shape, namely a long and very thin shape; Barbina-like shapes, namely Thin strands often coiled into nests, Little beards; Bigoli-like shapes, namely Thick tubes; Bucatini-like shapes, namely A thick spaghetti-like product with a hole running through the center; Capelli d'angelo-like shapes, namely A synonym of capellini, they are coiled into nests; Capellini-like shapes, namely The thinnest type of long product; Fusilli-like shapes, namely Long, thick, corkscrew shaped product that may be solid or hollow; Fusilli bucati-like shapes, namely Long coiled tubes that are hollow; Perciatelli which are identical to bucatini; Pici-like shapes, namely Very thick, long, hand rolled producty; Spaghettini-like shapes, namely Thin spaghetti; Vermicelli-like shapes, namely a traditional product round that is thicker than spaghetti; Vermicelloni-like shapes, namely Thick vermicelli which are Large or little worms-like products; Ziti-like shapes, namely Long, narrow hose-like tubes sized smaller than rigatoni but larger than mezzani; Zitoni-like shapes, namely Wider version of Ziti; Zitoni-like shapes, namely Large ziti; Biángbiáng noodles like shapes, namely Very wide ribbon cut rice noodles; Ciriole-like shapes, namely Thicker version of chitarra; Fettuce-like shapes, namely Wider version of fettuccine; Fettuccine-like shapes, namely Ribbon of product approximately 6.5 millimeters wide; Fettucelle-like shapes, namely Narrower version of fettuccine; Lagane-like shapes, namely Wide noodles; Lasagne-like shapes, namely Very wide noodles that often have fluted edge; Lasagnette-like shapes, namely Narrower version of lasagna; Little lasagne-like shapes, namely Longer version of lasagna; Linguettine-like shapes, namely Narrower version of linguine; Linguine-like shapes, namely Flattened spaghetti; Mafalde-like shapes, namely Short rectangular ribbons; Mafaldine-like shapes, namely Long ribbons with ruffled sides; Pappardelle-like shapes, namely Thick flat ribbon; Pillus-like shapes, namely Very thin ribbons; Pizzoccheri-like shapes, namely a type of short tagliatelle, a flat ribbon product; Sagnarelli-like shapes, namely Rectangular ribbons with fluted edges; Scialatelli or scilatielli-like shapes, namely Homemade long spaghetti with a twisted long spiral; Shahe fen-like shapes, namely Ribbon cut rice-like noodles; Spaghetti allachitarra-like shapes, namely products Similar to spaghetti, except square rather than round; Stringozzi-like shapes, namely those Similar to shoelaces; Tagliatelle-like shapes, namely Ribbon, generally narrower than fettuccine; Taglierini-like shapes, namely Thinner version of tagliatelle; Trenette-like shapes, namely Thin ribbon ridged on one side; Tripoline-like shapes, namely Thick ribbon ridged on one side; Calamarata-like shapes, namely Wide ring shaped product Squid-like; Calamaretti-like shapes, namely Little squids-like products; Cannelloni-like shapes, namely Large stuffable cylindrical (tube) product; Cavatappi-like shapes, namely Corkscrew-shaped macaroni; Chifferi-like shapes, namely Short and wide macaroni; Ditalini-like shapes, namely Short tubes; Elicoidali-like shapes, namely slightly ribbed tube product, the ribs are corked as opposed to those on rigatoni; Fagioloni-like shapes, namely Short narrow tube; Fideuà-like shapes, namely Short and thin tubes; Garganelli-like shapes, namely a square shape rolled into a tube; Gemelli-like shapes, namely a single S-shaped strand of product twisted in a loose spiral; Gomiti-like shapes, namely Bent tubes; Elbows Maccheroncelli-like shapes, namely Hollow tube-shaped product that is slightly smaller than a pencil in thickness; Maltagliati-like shapes, namely a short and wide with irregular or diagonally cut ends; Manicotti-like shapes, namely large stuffable ridged tubes; Marziani-like shapes, namely Short spirals; Mezzibombardoni-like shapes, namely Wide short tubes; Mostaccioli-like shapes, namely Similar to penne but without ridges; Paccheri-like shapes, namely Large tube product that may be prepared with a sauce atop them or stuffed with ingredients; Pasta al ceppo-like shapes, namely a sheet product that is similar in shape to a cinnamon stick; Penne-like shapes, namely Medium length tubes with ridges, cut diagonally at both ends; Penne rigate-like shapes, namely Penne with ridged sides; Penne lisce-like shapes, namely Penne with smooth sides; Penne zita-like shapes, namely Wider version of penne; Pennette-like shapes, namely Short thin version of penne; Pennoni-like shapes, namely a wider and thicker version of penne: a tube product with a diagonal cut on both ends; Rigatoncini-like shapes, namely Smaller version of rigatoni; Rigatoni-like shapes, namely Medium-Large tube with square-cut ends, sometimes slightly curved; Rotini-like shapes, namely product shape related to fusilli, but has a tighter helix, i.e. with a smaller pitch, Helix- or corkscrew-shaped product; Sagne 'ncannulate-like shapes, namely Long tube formed of twisted ribbon; Spirali-like shapes, namely a tube which spirals round; Spiralini-like shapes, namely More tightly-coiled fusilli; Trenne-like shapes, namely Penne shaped as a triangle; Trennette-like shapes, namely Smaller version of trenne; Tortiglioni-like shapes, namely Narrower rigatoni; Tuffoli-like shapes, namely Ridged rigatoni; Campanelle-like shapes, namely Flattened bell-shaped product with a frilly edge on one end; Capunti-like shapes, namely Short convex ovals resembling an open empty pea pod; Casarecce-like shapes, namely Short lengths rolled into a S shape; Cavatelli-like shapes, namely Short, solid; Cencioni-like shapes, namely Petal shaped, slightly curved with rough convex side; Conchiglie-like shapes, namely Seashell shaped shells; Conchiglioni-like shapes, namely Large, stuffable seashell shaped; Creste di galli-like shapes, namely Short, curved and ruffled; Croxetti-like shapes, namely Flat coin-shaped discs stamped with coats of arms; Farfalle-like shapes, namely Bow tie or butterfly shaped; Farfalloni-like shapes, namely Larger bow ties; Fiorentine-like shapes, namely Grooved cut tubes; Fiori-like shapes, namely Shaped like a flower; Foglie d'ulivo-like shapes, namely Shaped like an olive leaf; Gigli-like shapes, namely Cone or flower shaped Lilies; Gramigna-like shapes, namely Short curled lengths of product Infesting weed, esp. scutch-grass; Lanterne-like shapes, namely Curved ridges; Lumache-like shapes, namely Snailshell-shaped pieces; Lumaconi-like shapes, namely Large snail shell-shaped pieces; Maltagliati-like shapes, namely Flat roughly cut triangles Badly cut; Mandala-like shapes; Orecchiette-like shapes, namely Bowl- or ear-shaped product; Pipe-like shapes, namely Very similar to Lumaconi but has lines running the length of it; Quadrefiore-like shapes, namely Square with rippled edges; Radiatori-like shapes, namely Shaped like radiators; Ricciolini-like shapes, namely Short wide noodles with a 90-degrees twist; Ricciutelle-like shapes, namely Short spiraled noodles; Rotelle-like shapes, namely Wagon wheel-shaped product; Rotini-like shapes, namely 2-edged spiral, tightly wound, some vendors and brands are 3-edged and sold as rotini; Sorprese-like shapes, namely Bell shaped product with a crease on one side and has a ruffled edge; Sorprese Lisce-like shapes, namely Bell shaped product with a crease on one side and has a ruffled edge (A larger version of Sorprese); Strozzapreti-like shapes, namely Rolled across their width; Torchio-like shapes, namely Torch shaped; Trofie-like shapes, namely Thin twisted product; Acini di pepe-like shapes; Alfabeto-like shapes, namely product shaped as letters of the alphabet; Anellini-like shapes, namely Smaller version of anelli Little rings; Couscous-like shapes, namely Grain-like product; Conchigliette-like shapes, namely Small shell-shaped product; Corallini-like shapes, namely Small short tubes of product; Ditali-like shapes, namely Small short tubes; Ditalini-like shapes, namely Smaller versions of ditali; Farfalline-like shapes, namely Small bow tie-shaped product; Funghini-like shapes, namely Small mushroom-shaped product; Grattini-like shapes, namely Small granular, irregular shaped product (smaller version then Grattoni; Grattoni-like shapes, namely Large granular, irregular shaped product; Midolline-like shapes, namely Flat teardrop shaped product (similar to Orzo but wider); Occhi di pernice-like shapes, namely Very small rings of product; Orzo (also, risoni)-like shapes, namely Rice shaped product; Pastina-like shapes, namely Small spheres about the same size or smaller than acini di pepe; Pearl Pasta-like shapes, namely Spheres slightly larger than acini di pepe; Quadrettini-like shapes, namely Small flat squares of product; Stelline-like shapes, namely Smaller version of stele; Stortini-like shapes, namely Smaller version of elbow macaroni; Agnolotti-like shapes, namely Semicircular pockets; Cannelloni-like shapes, namely Rolls of product with various fillings, usually cooked in an oven; Cappelletti-like shapes, namely Square of dough, filled with minced meat, and closed to form a triangle Little caps; Casoncelli or casonsèi-like shapes, namely A stuffed product typical of Lombardy, with various fillings; Casunziei-like shapes, namely A stuffed product typical of the Veneto area, with various fillings; Fagottini-like shapes, namely A 'purse' or bundle of product; Maultasche-like shapes, namely a product stuffed with meat and spinach; Mezzelune-like shapes, namely Semicircular pockets; about 2.5 in. diameter—Half-moons; Occhi di lupo-like shapes, namely A large, penne-shaped product that is stuffed Ribbed wolf eyes; Pelmeni-like shapes, namely Russian dumplings; Sacchettoni-like shapes, namely Large little sacks; Tortellini-like shapes, namely Ring-shaped, stuffed with a mixture of meat and cheese; Tortelloni-like shapes, namely Round or rectangular, similar to ravioli, and any mixture or combination or derivative thereof.

All the many dozens of spaghetti-like fish or fish products defined above, even when manufactured for a similar fish-based paste, differ from each other in their organoleptic appearance, flavor, mouth-acceptance and taste.

The term 'about' refers in this patent to a value being bigger or smaller less than 20% of the defined measure.

It is in the scope of the invention wherein the pasta-like fish or fish products contains about 76% water, from about 5% to about 25% protein, from about 0% (gluten-free) to about 20% carbohydrate, and from about 1% to about 20% fat and its calorie content ranges from about 50 to about 500 calories per 100 gr, preferably about 100 calories per 100 gr.

It is in the scope of the invention wherein the pasta-like fish-containing edible product of the present invention is prepared in a method selected in on a non-limiting manner from the following: Molding techniques, in which the pasta-like fish-containing edible product are produced by molding the chopped fish-containing edible product paste into the desired shape. The molding as other techniques can be done in any conventional manner known in the art. Molding may be done by either a single extrusion or a co-extrusion.

In the foregoing description, embodiments of the invention, including preferred embodiments, have been presented for the purpose of illustration and description. They are not intended to be exhaustive or to limit the invention to the precise form disclosed. Obvious modifications or variations are possible in light of the above teachings. The embodiments were chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

The term 'Pasta-like Surimi' refers hereinafter in a non-limiting manner to Surimi-containing edible product shaped e.g., in one or more elongated or rounded or twisted or chopped or tied or folded shapes, such as those selected from a group consisting of Spaghetti-like shape, namely a long, thin, cylindrical, pseudo-cylindrical or polygonal cross section; noodle-like shape, namely a long and very thin shape; Barbina-like shapes, namely Thin strands often coiled into nests, Little beards; Bigoli-like shapes, namely Thick tubes; Bucatini-like shapes, namely A thick spaghetti-like product with a hole running through the center; Capelli d'angelo-like shapes, namely A synonym of capellini, they are coiled into nests; Capellini-like shapes, namely The thinnest type of long product; Fusilli-like shapes, namely Long, thick, corkscrew shaped product that may be solid or hollow; Fusilli bucati-like shapes, namely Long coiled tubes that are hollow; Perciatelli which are identical to bucatini; Pici-like shapes, namely Very thick, long, hand rolled product'; Spaghettini-like shapes, namely Thin spaghetti; Vermicelli-like shapes, namely a traditional product round that is thicker than spaghetti; Vermicelloni-like shapes, namely Thick vermicelli which are Large or little worms-like products; Ziti-like shapes, namely Long, narrow hose-like tubes sized smaller than rigatoni but larger than mezzani; Zitoni-like shapes, namely Wider version of Ziti; Zitoni-like shapes, namely Large ziti; Biángbiáng noodles like shapes, namely Very wide ribbon cut rice noodles; Ciriole-like shapes, namely Thicker version of chitarra; Fettuce-like shapes, namely Wider version of fettuccine; Fettuccine-like shapes, namely Ribbon of product approximately 6.5 millimeters wide; Fettucelle-like shapes, namely Narrower version of fettuccine; Lagane-like shapes, namely Wide noodles; Lasagne-like shapes, namely Very wide noodles that often have fluted edge; Lasagnette-like shapes, namely Narrower version of lasagna; Little lasagne-like shapes, namely Longer version of lasagna; Linguettine-like shapes, namely Narrower version of linguine; Linguine-like shapes, namely Flattened spaghetti; Mafalde-like shapes, namely Short rectangular ribbons; Mafaldine-like shapes, namely Long ribbons with ruffled sides; Pappardelle-like shapes, namely Thick flat ribbon; Pillus-like shapes, namely Very thin ribbons; Pizzoccheri-like shapes, namely a type of short tagliatelle, a flat ribbon product; Sagnarelli-like shapes, namely Rectangular ribbons with fluted edges; Scialatelli or scilatielli-like shapes, namely Homemade long spaghetti with a twisted long spiral; Shahe fen-like shapes, namely Ribbon cut rice-like noodles; Spaghetti allachitarra-like shapes, namely products Similar to spaghetti, except square rather than round; Stringozzi-like shapes, namely those Similar to shoelaces; Tagliatelle-like shapes, namely Ribbon, generally narrower than fettuccine; Taglierini-like shapes, namely Thinner version of tagliatelle; Trenette-like shapes, namely Thin ribbon ridged on one side; Tripoline-like shapes, namely Thick ribbon ridged on one side; Calamarata-like shapes, namely Wide ring shaped product Squid-like; Calamaretti-like shapes, namely Little squids-like products; Cannelloni-like shapes, namely Large stuffable cylindrical (tube) product; Cavatappi-like shapes, namely Corkscrew-shaped macaroni; Chifferi-like shapes, namely Short and wide macaroni; Ditalini-like shapes, namely Short tubes; Elicoidali-like shapes, namely slightly ribbed tube product, the ribs are corked as opposed to those on rigatoni; Fagioloni-like shapes, namely Short narrow tube; Fideuà-like shapes, namely Short and thin tubes; Garganelli-like shapes, namely a square shape rolled into a tube; Gemelli-like shapes, namely a single S-shaped strand of product twisted in a loose spiral; Gomiti-like shapes, namely Bent tubes; Elbows Maccheroncelli-like shapes, namely Hollow tube-shaped product that is slightly smaller than a pencil in thickness; Maltagliati-like shapes, namely a short and wide with irregular or diagonally cut ends; Manicotti-like shapes, namely large stuffable ridged tubes; Marziani-like shapes, namely Short spirals; Mezzi bombardoni-like shapes, namely Wide short tubes; Mostaccioli-like shapes, namely Similar to penne but without ridges; Paccheri-like shapes, namely Large tube product that may be prepared with a sauce atop them or stuffed with ingredients; Pasta al ceppo-like shapes, namely a sheet product that is similar in shape to a cinnamon stick; Penne-like shapes, namely Medium length tubes with ridges, cut diagonally at both ends; Penne rigate-like shapes, namely Penne with ridged sides; Penne lisce-like shapes, namely Penne with smooth sides; Penne zita-like shapes, namely Wider version of penne; Pennette-like shapes, namely Short thin version of penne; Pennoni-like shapes, namely a wider and thicker version of penne: a tube product with a diagonal cut on both ends; Rigatoncini-like shapes, namely Smaller version of rigatoni; Rigatoni-like shapes, namely Medium-Large tube with square-cut ends, sometimes slightly curved; Rotini-like shapes, namely product shape related to fusilli, but has a tighter helix, i.e. with a smaller pitch, Helix- or corkscrew-shaped product; Sagne 'ncannulate-like shapes, namely Long tube formed of twisted ribbon; Spirali-like shapes, namely a tube which spirals round; Spiralini-like shapes, namely More tightly-coiled fusilli; Trenne-like shapes, namely Penne shaped as a triangle; Trennette-like shapes, namely Smaller version of trenne; Tortiglioni-like shapes, namely Narrower rigatoni; Tuffoli-like shapes, namely Ridged rigatoni; Campanelle-like shapes, namely Flattened bell-shaped product with a frilly edge on one end; Capunti-like shapes, namely Short convex ovals resembling an open empty pea pod; Casarecce-like shapes, namely Short lengths rolled into a S shape; Cavatelli-like shapes, namely Short, solid; Cencioni-like shapes, namely Petal shaped, slightly curved with rough convex side; Conchiglie-like shapes, namely Seashell shaped shells; Conchiglioni-like shapes, namely Large, stuffable seashell shaped; Creste di galli-like shapes, namely Short, curved and ruffled; Croxetti-like shapes, namely Flat coin-shaped discs stamped with coats of arms; Farfalle-like shapes, namely Bow tie or butterfly shaped; Farfalloni-like shapes, namely Larger bow ties; Fiorentine-like shapes, namely Grooved cut tubes; Fiori-like shapes, namely Shaped like a flower; Foglie d'ulivo-like shapes, namely Shaped like an olive leaf; Gigli-like shapes, namely Cone or flower shaped Lilies; Gramigna-like shapes, namely Short curled lengths of product Infesting weed, esp. scutch-grass; Lanterne-like shapes, namely Curved ridges; Lumache-like shapes, namely Snailshell-shaped pieces; Lumaconi-like shapes, namely Large snail shell-shaped pieces; Maltagliati-like shapes, namely Flat roughly cut triangles Badly cut; Mandala-like shapes; Orecchiette-like shapes, namely Bowl- or ear-shaped product; Pipe-like shapes, namely Very similar to Lumaconi but has lines running the length of it; Quadrefiore-like shapes, namely Square with rippled edges; Radiatori-like shapes, namely Shaped like radiators; Ricciolini-like shapes, namely Short wide noodles with a 90-degrees twist; Ricciutelle-like shapes, namely Short spiralled noodles; Rotelle-like shapes, namely Wagon wheel-shaped product; Rotini-like shapes, namely2-edged spiral, tightly wound, some vendors and brands are 3-edged and sold as rotini; Sorprese-like shapes, namely Bell shaped product with a crease on one side and has a ruffled edge; Sorprese Lisce-like shapes, namely Bell shaped product with a crease on one side and has a ruffled edge (A larger version of Sorprese); Strozzapreti-like shapes, namely Rolled across their width; Torchio-like shapes, namely Torch shaped; Trofie-like shapes, namely Thin twisted product; Acini di pepe-like shapes; Alfabeto-like shapes, namely product shaped as letters of the alphabet; Anellini-like shapes, namely Smaller version of anelli Little rings; Couscous-like shapes, namely Grain-like product; Conchigliette-like shapes, namely Small shell-shaped product; Corallini-like shapes, namely Small short tubes of product; Ditali-like shapes, namely Small short tubes; Ditalini-like shapes, namely Smaller versions of ditali; Farfalline-like shapes, namely Small bow tie-shaped product; Funghini-like shapes, namely Small mushroom-shaped product; Grattini-like shapes, namely Small granular, irregular shaped product (smaller version then Grattoni; Grattoni-like shapes, namely Large granular, irregular shaped product; Midolline-like shapes, namely Flat teardrop shaped product (similar to Orzo but wider); Occhi di pernice-like shapes, namely Very small rings of product; Orzo (also, risoni)-like shapes, namely Rice shaped product; Pastina-like shapes, namely Small spheres about the same size or smaller than acini di pepe; Pearl Pasta-like shapes, namely Spheres slightly larger than acini di pepe; Quadrettini-like shapes, namely Small flat squares of product; Stelline-like shapes, namely Smaller version of stele; Stortini-like shapes, namely Smaller version of elbow macaroni; Agnolotti-like shapes, namely Semicircular pockets; Cannelloni-like shapes, namely Rolls of product with various fillings, usually cooked in an oven; Cappelletti-like shapes, namely Square of dough, filled with minced meat, and closed to form a triangle Little caps; Casoncelli or casonsèi-like shapes, namely A stuffed product typical of Lombardy, with various fillings; Casunziei-like shapes, namely A stuffed product typical of the Veneto area, with various fillings; Fagottini-like shapes, namely A 'purse' or bundle of product; Maultasche-like shapes, namely a product stuffed with meat and spinach; Mezzelune-like shapes, namely Semicircular pockets; about 2.5 in. diameter—Half-moons; Occhi di lupo-like shapes, namely A large, penne-shaped product that is stuffed Ribbed wolf eyes; Pelmeni-like shapes, namely Russian dumplings; Sacchettoni-like shapes, namely Large little sacks; Tortellini-like shapes, namely Ring-shaped, stuffed with a mixture of meat and cheese; Tortelloni-like shapes, namely Round or rectangular, similar to ravioli, and any mixture or combination or derivative thereof.

All the many dozens of pasta-like Surimi products defined above, even when manufactured for a similar fish-based paste, differ each other in their organoleptic appearance, flavor, mouth-acceptance and taste.

It is in the scope of the invention wherein the pasta-like Surimi contains about 76% water, from about 5% to about 25% protein, from about 0% (gluten-free) to about 20% carbohydrate, and from about 1% to about 20% fat and its calorie content ranges from about 50 to about 500 calories per 100 gr, preferably about 100 calories per 100 gr.

It is in the scope of the invention wherein the pasta-like Surimi of the present invention is prepared in a method selected ion a non-limiting manner form the following: Molding techniques, in which the spaghetti-like Surimi products are produced by molding the chopped Surimi paste into the desired shape and allowing it to set and form an elastic gel. The molding as other techniques can be done as presented by Rahul Kuma, see Surimi technology, currently available in: http://www.scribd.com/doc/39341260/Surimi-Technology, which is incorporated herein as a reference. Molding may be done by either a single extrusion or a coextrusion. Coextrusion gives a meat like texture, whereas the single extrusion results in a uniform and rather rubbery mouth feel. Fiberizing techniques: here the products are produced by extruding the paste into a thin sheet through a rectangular nozzle having a narrow opening e.g., 1-2 mm. The extruded sheet is then partially heat set and cut into strips of desired width by a cutter, similar to a noodle cutter, having a clearance that allows only partial cutting (<⅘ of the thickness), so that a sheet of strips results. Fine strips are preferred for the fibrous crab leg product, whereas wider strips are more suitable for the crab flakes and chunks as well as for scallop analogs. The resulting sheet of strips is folded into a rope (a bundle of fibers) by a simple narrowing device called a rope former. The rope is then colored, wrapped, and cut into a desired length by a wrapping machine. Composite-Molding: For these products, the strings or shreds of desired length are mixed with Surimi paste and extruded into a desired shape. Strings or shreds are produced either by the method just described or by shredding a block of Surimi gel into thin rectangular pieces (<1 mm thick). Texture can be manipulated by adjusting the mixing ratio of strings and shreds and Surimi paste (binder). Another type of composite-molding technique called fish ham where the Surimi is prepared by mixing the dice of e.g., cured tuna and e.g., pork into the fish paste before extrusion.

It should be noted and acknowledged that the present invention additionally discloses a method of inducing a physiologically acceptable ketosis such as to treat a patient in need of therapy for one or more of amylotrophic lateral sclerosis, and Duchenne's muscular dystrophy comprising oral administration to said patient of a ketogenic diet comprising administering portions of an edible product comprising fish or portions thereof, said product characterized as a pasta-like shape with about 5% to about 25% protein and about 1% to about 20% fat, further wherein the physiologically acceptable ketosis is characterized by blood levels of (R)-3-hydroxybutyrate of from 0.5 to 20 mM It should be further be noted and acknowledged that the present invention additionally discloses a method of maintaining or increasing muscle mass and/or muscle strength in a mammalian subject, the method comprising providing to the mammalian subject a sufficient amount of a nutritive composition comprising comprises the following properties: a simulated gastric digestion half-life of less than 60 minutes It should yet further be noted and acknowledged that the present invention additionally discloses a method of supplementing the diet of an individual comprising a step of administering to an individual an edible product comprising fish or portions thereof, said product characterized as a spaghetti-like shape wherein said edible product is administered to said individual 0-60 minutes following a workout. It should be noted and acknowledged that the present invention additionally discloses a method of at least partially reversing weight gain, comprising: identifying an individual who experienced or who is experiencing weight gain; and administering to the individual an edible product comprising fish or portions thereof, said product characterized as a spaghetti-like shape, wherein said edible product is ketogenic and comprises about 5% to about 25% protein and about 1% to about 20% fat.

What is claimed is:

1. A pasta-like shaped edible product comprising surimi, fish or portions thereof, prepared by a process consisting of the steps of:
   a. chopping frozen surimi selected from the group consisting of grade A, AA or FA or any combination thereof to chips;
   b. introducing the surimi chips in a predetermined ratio to cold water and salt to provide a mixture;
   c. providing additives to said mixture;
   d. homogenizing said mixture at a speed of about 2000 to about 5500 rpm under vacuum for about 1 to about 5 minutes until a homogenized mass is produced;
   e. adding vegetable oil and homogenizing to a homogenic emulsion in a maximal temperature of about 8 degrees Celsius;
   f. injecting the mass to a pasta molding head;
   g. refrigerating said mass for at least about 6 hours;
   h. molding a predetermined shape, under low pressure of no more than about 2 bar;
   i. transporting said molded pasta on a conveyor belt heated to about 40 to about 50 degrees Celsius;
   j. cooling said edible product
wherein said process provides said pasta-like shaped edible product characterized by (a) Omega 3 to Omega 6 ratio of at least 5:1; and
(b) fat levels of about 1% to about 20%;
wherein said step of cooling is performed for about 4 hours at about 4 degrees Celsius to about 6 degrees Celsius;
wherein said step (d) of homogenizing said mixture is performed under vacuum to provide a deaerated Al dente texture to said mixture;
wherein an additional step of drying said pasta-like shaped edible product after said step of cooling is excluded such that no additional re-cooking of said pasta-like shaped edible product is required.

2. The edible product of claim 1 comprising surimi, fish or portions thereof, wherein said pasta-like shape is characterized by a long thin cylindrical-like shape with a solid central core.

3. The edible product of claim 1 comprising surimi, fish or portions thereof, said pasta-like shape characterized by a solid central core, a main longitudinal axis of about 1 to about 30 cm length and diameter ranges from about 1 mm to about 6 mm.

4. The edible product of claim 1 comprising surimi, fish or portions thereof, said pasta-like shape characterized by a main non-solid core a main longitudinal axis of about 1 to about 30 cm length and diameter ranges from about 1 mm to about 30 mm.

5. The edible product of claim 1 comprising surimi, fish or portions thereof, said pasta-like shape characterized by having the same cross-sectional area.

6. The edible product of claim 1 comprising surimi, fish or portions thereof, said pasta-like shape characterized by a main longitudinal axis of about 5 to about 50 cm and by a main latitudinal axis of about ranges from about 3 mm to about 200 mm.

7. The edible product of claim 1 comprising surimi, fish or portions thereof, wherein said pasta-like shape characterized by a shape selected from the group consisting of: Spaghetti-like shape, noodle-like shape, Barbina-like shape, Bigoli-like shape, Bucatini-like shape, Capelli d'angelo-like shape, Capellini-like shape, Fusilli-like shape, Fusilli bucati-like shape, Perciatelli-like shape, Pici-like shape, Spaghettini-like shape, Vermicelli-like shape, Vermicelloni-like shape, Ziti-like shape, Zitoni-like shape, Zitoni-like shape, Biángbiáng noodles like shape, Ciriole-like shape, Fettuce-like shape, Fettuccine-like shape, Fettucelle-like shape, Lagane-like shape, Lasagne-like shape, Lasagnette-like shape, Little lasagne-like shape, Linguettine-like shape, Linguine-like shape, Mafalde-like shape, Mafaldine-like shape, Pappardelle-like shape, Pillus-like shape, Pizzoccheri-like shape, Sagnarelli-like shape, Scialatelli or scilatielli-like shape, Shahe fen-like shape, Spaghetti alla-chitarra-like shape, Stringozzi-like shape, Tagliatelle-like shape, Taglierini-like shape, Trenette-like shape, Tripoline-like shape, Calamarata-like shape, Calamaretti-like shape, Cannelloni-like shape, Cavatappi-like shape, Chifferi-like shape, Ditalini-like shape, Elicoidali-like shape, Fagioloni-like shape, Fideuà-like shape, Garganelli-like shape, Gemelli-like shape, Gomiti-like shape, Elbows Maccheroncelli-like shape, Maltagliati-like shape, Manicotti-like shape, Marziani-like shape, Mostaccioli-like shape, Paccheri-like shape, Pasta al ceppo-like shape, Penne-like shape, Penne rigate-like shape, Penne lisce-like shape, Penne zita-like shape, Pennette-like shape, Pennoni-like shape, Rigatoncini-like shape, Rigatoni-like shape, Sagne 'ncannulate-like shape, Spirali-like shape, Spiralini-like shape, Trenne-like shape, Trennette-like shape, Tortiglioni-like shape, Tuffoli-like shape, Campanelle-like shape, Capunti-like shape, Casarecce-like shape, Cavatelli-like shape, Cencioni-like shape, Conchiglie-like shape, Conchiglioni-like shape, Creste di galli-like shape, Croxetti-like shape, Farfalle-like shape, Farfalloni-like shape, Fiorentine-like shape, Fiori-like shape, Foglie d'ulivo-like shape, Gigli-like shape, Gramigna-like shape, Lanterne-like shape, Lumache-like shape, Lumaconi-like shape, Maltagliati-like shape, Mandala-like shape, Orecchiette-like shape, Pipe-like shape, Quadrefiore-like shape, Radiatori-like shape, Ricciolini-like shape, Ricciutelle-like shape, Rotelle-like shape, Rotini-like shape, Sorprese-like shape, Sorprese Lisce-like shape, Strozzapreti-like shape, Torchio-like shape, Trofie-like shape, Alfabeto-like shape, Anellini-like shape, Couscous-like shape, Conchigliette-like shape, Corallini-like shape, Ditali-like shape, Ditalini-like shape, Farfalline-like shape, Funghini-like shape, Grattini-like shape, Grattoni-like shape, Midolline-like shape, Occhi di pernice-like shape, Orzo (also, risoni)-like shape, Pastina-like shape, Pearl Pasta-like shape, Quadrettini-like shape, Stelline-like shape, Stortini-like shape, Agnolotti-like shape, Cannelloni-like shape, Cappelletti-like shape, Casoncelli or casonsèi-like shape, Casunziei-like shape, Fagottini-like shape, Maultasche-like shape, Mezzelune-like shape, Occhi di lupo-like shape, Pelmeni-like shape, Sacchettoni-like shape, Tortellini-like shape, Tortelloni-like shape, and any mixture or combination or derivative thereof.

8. The edible product of claim 1 comprising surimi, fish or portions thereof, wherein said pasta-like shape is formed by a method selected from the group consisting of extrusion, coextrusion, forming, molding, composite molding, fiberizing, forming into spaghetti or any combination thereof.

9. The edible product of claim 1 comprising surimi, fish or portions thereof, wherein said product additionally comprises food additives selected from the group consisting of starch, egg white, salt, oil, wheat, humectants, sorbitol, sugar, gelling agents, soy, soy protein, pea protein, milk protein, lactic acid, seasonings, transglutaminases, monosodium glutamate, food enhancers, food colorants, food flavorings, food stabilizers and any combination thereof.

10. The edible product of claim 1 comprising surimi with native protein, fish or portions thereof, wherein said Surimi comprises, or made of, any fish selected from the group consisting of Alaska Pollock (*Theragrachalcogramma*), Atlantic cod (*Gadusmorhua*), Big-head pennah croaker (*Pennahiamacrocephalus*), Bigeyes (*Priacanthusarenatus*), Golden threadfin bream (*Nemipterusvirgatus*), Milkfish (*Chanoschanos*), Pacific whiting (*Merlucciusproductus*), shark, Swordfish, (*Xiphiasgladius*), Tilapia (Oreochromismossambicus, *Oreochromisniloticus*), Atlantic salmon (*Salmo salar*), Chum salmon (*Oncorhynchus keta*), King salmon (*Oncorhynchus tshawytscha*), Coho salmon (*Oncorhynchus kisutch*), Pink salmon (*Oncorhynchus gorbuscha*), Sockeye salmon, Skipjack tuna, White fish, Lake whitefish, Whiting (*Merluccius Hubbsi*) or any combination thereof.

11. The edible product of claim 1 comprising surimi with native protein, fish or portions thereof, wherein any parameters selected from the group consisting of organoleptically perceivable flavor, mouth-acceptance, mouth feel and taste correlate with predetermined shape and/or dimension of said product, for a given recipe.

12. The edible product of claim 1 comprising surimi, fish or portions thereof, wherein said additives make the product suitable for freezing.

13. The edible product of claim 1 comprising surimi, fish or portions thereof, wherein said additives make the product suitable for refrigerating.

14. The edible product of claim 1 comprising surimi, fish or portions thereof, wherein said product additionally comprises cryoprotectants.

15. The edible product of claim 1 comprising surimi, fish or portions thereof, wherein said product has a calorific content of about 50 calories to about 500 calories per 100 g of product.

16. A high satiety index edible product, comprising: an edible product comprising fish or portions thereof, said product characterized as a pasta-like shape wherein said product provides an increased satiety index relative to unprocessed cooked fish and wherein said product provides a low glycemic index compared to conventional pasta.

17. The edible product of claim 1 comprising surimi, fish or portions thereof, wherein said edible product is useful for inducing ketogenic metabolism in a patient thereof.

18. The edible product of claim 1 comprising surimi, fish or portions thereof, wherein said product comprises from about 5% to about 25% protein.

* * * * *